ROTARY DRIVING MECHANISM

Original Filed Aug. 20, 1965 2 Sheets-Sheet 1

INVENTOR.
CLIFFORD C. BOTTOMS
BY
ATTORNEY

ROTARY DRIVING MECHANISM

Original Filed Aug. 20, 1965 2 Sheets-Sheet 2

CLIFFORD C. BOTTOMS
INVENTOR.

BY

ATTORNEY

United States Patent Office

Re. 26,745
Reissued Dec. 30, 1969

26,745
ROTARY DRIVING MECHANISM

Clifford C. Bottoms, 403 Orange,
San Fernando, Calif. 91340

Original No. 3,345,832, dated Oct. 10, 1967, Ser. No. 481,261, Aug. 20, 1965. Application for reissue May 29, 1968, Ser. No. 741,809
Int. Cl. F16d *3/06;* E21b *17/00*
U.S. Cl. 64—23 12 Claims

Matter enclosed in heavy brackets [ ] appears in the original patent but forms no part of this reissue specification; matter printed in italics indicates the additions made by reissue.

*ABSTRACT OF THE DISCLOSURE*

*A well tool comprising a rotatingly driven outer barrel and a reciprocating inner barrel keyed together by rolling members positioned in axial channels formed in the inner surface of the outer barrel and the outer surface of the inner barrel.*

This invention pertains to a mechanism for driving one shaft by another, and particularly to such a mechanism adapted for use in a drilling tool, such as an oil well drill or the like.

In the art of deep well drilling, a hollow tubular structure, designated the outer barrel, is inserted in the well bore and is used to supply rotary driving force to the drilling bit. The drilling bit is attached to a mandrel-like member which is called a driver sub.

In one kind of well tool, the driver sub is connected to another mandrel-like member which is called an upper sub. The connected subs are designated an inner barrel. The inner barrel is adapted to slide or translate axially relative to the outer barrel, and means are provided to transmit torque from the outer to the inner barrel. Spring shoulders are formed on the inner surface of the outer barrel and the outer surface of the inner barrel. A spring, ususally a coiled spring is positioned between the shoulders, usually surrounding the inner barrel, to bias or force the inner barrel into its axially extended position relative to the outer barrel and to force the drilling bit into engagement with the rock. As the drilling progresses, drilling mud is forced downwardly through an axial bore in the inner barrel, through nozzles adjacent the bit into the well bore, where it serves to lubricate the bit and the outer barrel. Any tendency for the bit and inner barrel to oscillate is reduced by the spring and to some extent, by the damping effect of the drilling mud. Such a spring biased sub is called a percussion sub.

In a second kind of well tool, the driver sub is weighted by heavy weights to cause the drilling bit to remain in contact with the rock. The driver sub and the weights are connected to an extended mandrel-like upper member, called a bumper sub, which is an inner barrel, enclosed in the cylindrical outer barrel driving member. Means are provided to transmit torque from the outer barrel to the bumper sub while allowing relative axial translation therebetween.

The travel between the inner and outer barrels in the percusssion sub type of tool may be on the order of one foot or less. In the bumper sub type of tool, the travel between the outer barrel and the bumper sub may be on the order of five feet or more, thus allowing the outer barrel to be carried by a ship which is rising and falling. In both kinds of tools, stops are used to prevent excessive translation between the outer and inner barrels.

In prior art devices the various engagement means employed between the inner and outer barrels to transmit torque between the barrels, were subject to excessive friction which opposed the free or spring-induced relative axial translation between the barrels. It was not unusual to require tens of tons of axial force to cause the required translation. Due to the excessive friction, the engaging surfaces would wear, causing rotational play between the barrels and reducing the life of the tool. Further, because of the need to use great weights with these bumper subs, the moment of inertia of the weights increased the amount of torque necessary to rotate the inner barrel, weights and driver sub, and the overall drilling efficiency of the tools was substantially impaired.

The device of this invention uses rolling means between the inner and outer barrels to transmit torque while allowing relative axial translation. As one result, the friction is substantially reduced. For example, where perhaps twenty tons of axial force might be required before this invention, now only about 1,000 pounds of axial force may furnish the equivalent drilling effect.

In one embodiment of the device of this invention, a plurality of axially directed channels are formed, by machining or other convenient methods, on the inner surface of the outer barrel. The channels are distributed at spaced intervals about the circumference of the barrel. A like number of channels are formed on the outer surface of the inner barrel to register with the channels on the inner surface of the outer barrel. With the inner barrel inserted in the outer barrel and the channels in registry, a plurality of hardened steel balls are placed in each of the axial races formed thereby so that each ball rolls freely between the two barrels. The balls thus carry torque from the outer to the inner barrel. Preferably the channels are contoured to the balls to allow them to roll with a maximum of wear on the contact surfaces.

In a second embodiment of the invention, the barrels are adapted to receive a plurality of axles directed radially inwardly from the inner surface of the outer barrel or alternatively, outwardly from the outer surface of the inner barrel. The latter arrangement is preferable for ease of assembly. The axles are arranged in spaced axially aligned rows. On the adjacent surface of the other barrel, in register with these rows, are a plurality of axially oriented channels adapted to receive rolling members, such as rollers. A roller is attached to each axle and rolls in one of the channels. The contour of the channel is adapted to match the shape of the rollers.

The rollers may be mounted on bearings to rotate relative to the axles or, alternatively, may be fixed to the axles with the axles mounted in bearings relative to their supporting barrel.

The rollers may be of various shapes, as for example, cylindrical, conical or spherical.

Further, although it may be desirable that all of the channels be axially aligned, it is not necessary, and they may be staggered along the barrel.

A permanent lubricant, such as oil, surrounds the rolling members and is retained by means of packings placed near the ends of the channels. These packings also function to keep dirt out of the rolling means. In a percussion sub, the lubricant may also surround the spring as well as all of the internal moving parts.

It is an object of this invention to reduce the friction between an inner and outer barrel of a well tool.

It is another object of this invention to provide means for efficiently transmitting torque between well tool barrels having greatly reduced frictional resistance to relative axial translation.

It is still another object to use rolling means having one degree of freedom of motion while transmitting torque between two shafts.

A further object of this invention is to provide a very durable, easily manufactured means to transmit torque between two substantially coaxial shafts while allowing axial translation therebetween.

It is a specific object of this invention to provide apparatus which is adapted to achieve the above enumerated objects.

Other objects will become apparent from the following description, taken in connection with the accompanying drawings in which.

Figure 2:
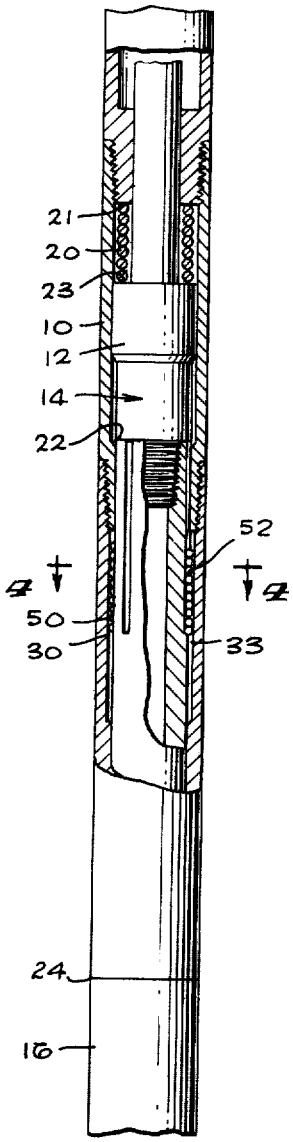
FIGURE 2 is a similar view of the device of FIGURE 1, with the sub shown in its retracted position.
Figure 4:
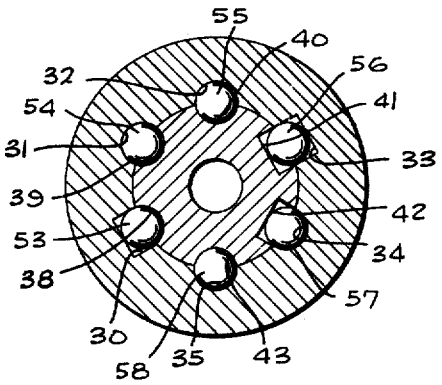
Figure 5:
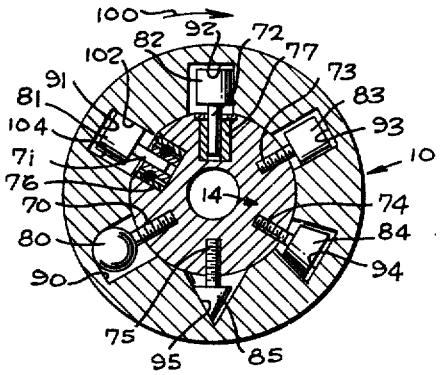

FIGURE 4 is an exaggerated view, partly in section, taken at a position corresponding to 4—4 in FIGURE 2 and showing a fanciful array of several alternative forms of channels adapted to receiving the rolling means of the invention; and FIGURE 5 is a similar exaggerated view, partly in section, taken at a position corresponding to 4—4 in FIGURE 2, showing several other alternative embodiments of rolling means, their attachment means, and their associated receiving channels.

Wherever possible like numerals are used in the drawings to designate like parts.

Figure 1:
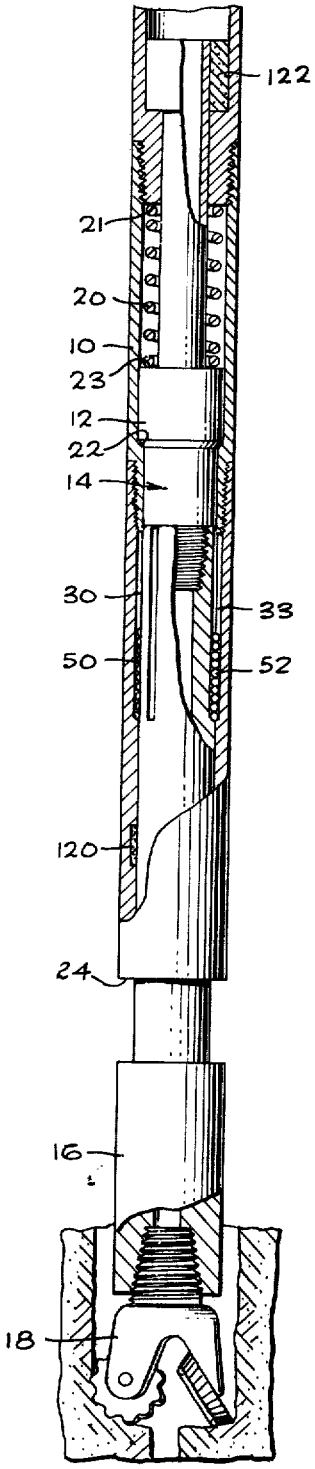
FIGURE 1 is a side elevational view, partly in profile and partly in section, with several portion cut away showing a well tool embodying this invention employing a percussion sub, with the sub in its extended position.

In the well tool of FIGURES 1 and 2, an outer barrel 10 drives a percussion sub 12, forming a portion of an inner barrel 14. The percussion sub 12 is connected to drive a driver sub 16 which drives the bit 18. The inner barrel 14, comprising the percussion sub 12 and the driver sub 16, is biased toward an extended position by a coil spring 20 which seats between a shoulder 21 on the inner surface of the outer barrel 10 and a shoulder 23 on the outer surface of the inner barrel 14. The length of travel is between stop 22 in the extended position of FIGURE 1 and stop 24 in the retracted position of FIGURE 2.

Figure 3:
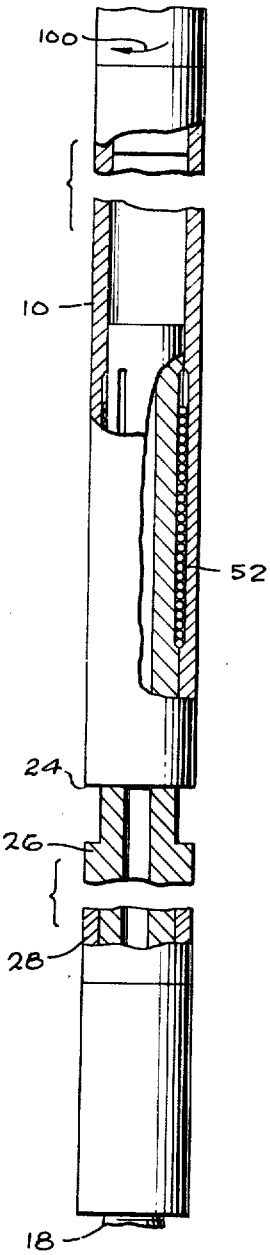
FIGURE 3 is a similar view, partly in profile and partly in section, of a well tool of this invention employing a bumper sub.

In the well tool of FIGURE 3, an outer barrel 10 drives a bumper sub 26 which is attached to drive a driver sub 16 and a bit 18. Connected above the driver sub 16 is a plurality of weights, called "collars," one of which is shown at 28. These weights aid in keeping the bit 18 in contact with the rock during the actual drilling operation.

The travel of a typical bumper sub 26 relative to the outer barrel 10 is on the order of five feet; however, this may be substantially increased where, as in drilling operations at sea, the drilling rig is rising and falling and it is necessary to compensate for this movement in order to keep the drill at the bottom of the hole.

In the well tool of FIGURES 1 and 2, the inner barrel, comprising the percussion sub and driver sub, are driven by the same mechanism as the inner barrel comprising the bumper sub 26 of FIGURE 3.

In the drawings the channels are depicted as being uniformly circumferentially distributed. This is a preferred embodiment but is not absolutely necessary. Further, although the channels 30 and 33 are shown extending axially the same distance, and are axially positioned in the same region, the channels may be axially staggered (not shown) if desired.

A plurality of circumferentially disposed substantially axial aligned channels is formed on the inner surface of the outer barrel 10. These channels may take a number of shapes, such as those illustrated in FIGURE 4, and designated by numerals 30, 31, 32, 33, 34 and 35. Generally in practice all of the channels in a given barrel will be identical, whether rectangular in cross section, as channels 30 and 33, or of one of the other sectional forms shown or suggested.

On the outer surface of the inner barrel 14 a plurality of substantially axially directed channels, equal in number and in register with the channels on the outer barrel is formed. Typical channels 38, 39, 40, 41, 42 and 43 are shown in the section view of FIGURE 4, in register with the channels 30, 31, 32, 33, 34 and 35 on the outer barrel. Although channels 41 and 42 are shown rectangular in section, while the remaining channels are circular in section, in a preferred embodiment of the invention all of the channels on the inner barrel will have the same shape and will be identical with those on the outer barrel. The two shapes are shown by way of example only. The structures formed by registering pairs of channels in the two barrels effectively form a plurality of keyways, and constitute an essential part of the subject invention.

A plurality of rolling means, such as steel balls, shown generally at 50 and 52 in FIGURES 1, 2 and 3 are inserted in the keyways formed by adjacent pairs of channels in the inner and outer barrels. A typical set of such balls are also shown in FIGURE 4 at 53, 54, 55, 56, 57 and 58.

As an alternative form of rolling means, a plurality of radially outward extending axles may be attached to the outer surface of the inner barrel 14. The axles are preferably aligned in axially directed rows. The rows are circumferentially distributed about the coincident central longitudinal axes of the barrels. On each of the axles is a roller. A plurality of axially directed channels are formed in the inner surface of the outer barrel to receive the rollers.

FIGURE 5 is offered to show several different embodiments of these rollers and to show a few of the possible cross-sectional forms the channels may take. The size of the rollers and channels relative to the dimensions of the inner and outer barrels has been exaggerated. Further, it is to be stressed that the axles are shown attached to the inner barrel with the channels in the outer barrel only for convenience of assembly. Although not so illustrated in the drawings, it is within the scope of this invention to attach the axles to the outer barrel, and to form the receiving channels in the inner barrel.

Referring to FIGURE 5, a plurality of axles 70, 71, 72, 73, 74 and 75 are shown attached to the inner barrel 14. The axles 71 and 72 are shown mounted for rotation, relative to barrel 14, upon bearings 76 and 77. The remaining axles are shown screwed into the inner barrel 14. The different embodiments are by way of example only. Mounted upon the axles are rolling means such as rollers 80, 81, 82, 84 and 85. Each of the rollers 81, 82 and 83 is shown as cylindrical in shape. Roller 80 is shown as spherical, roller 84 is shown as a truncated diverging cone, and roller 85 is shown as a truncated converging cone. These five shapes are not intended to be exhaustive of the forms the rolling means may take, but are representative examples only. In a preferred embodiment all of the rollers would be substantially identical. The channels 90, 91, 92, 93, 94 and 95 are axially aligned in register with rows of the rollers and are contoured to conform to their associated rollers. Notice that for a rotation direction indicated by arrow 100, the channels are contoured to cause the rollers to contact the channel sides, for example at 102, to carry torque from barrel 10 to barrel 14. Clearance is provided, as for example at 104, to prevent the rollers from rubbing excessively against the sides of the channels. Notice that when the axles, such as axles 71 and 72, are mounted for rotation upon bearings, such as bearings 76 and 77, relative to the inner barrel 14, the rollers 81 and 82 are usually firmly attached to the axles. When the axles, such as axles 70, 73, 74 and 75 are firmly attached to barrel 14, their associated rollers 80, 83, 84 and 85 are mounted upon bearings (not shown) for free rotating relative to their supporting axles.

To protect the moving parts of the rolling means in all of the embodiments of this invention, it is desirable to lubricate the balls, rollers, and bearings. To that end, a lubricant, such as oil, is inserted into the spaces surrounding the moving parts. In a well tool using a percussion sub, it is frequently also desirable to lubricate the spring 20. To prevent the lubricant from leaking out and to prevent dirt and drilling mud from leaking in, typical packings such as those shown at 120 and 122 are used.

In combination the keyways formed by the channels on the inner or outer barrel or by registering pairs of channels in both barrels and the rolling means associated with them form a structure which serves as an extremely efficient, new and novel torque transmitting spline which is adaptable to a great variety of uses.

In operation, the outer barrel 10 is rotated by means (not shown) located in the drilling rig above ground. The rolling means, such as the balls 50, 52, 53, 54, 55, 56, 57 and 58 of FIGURES 1–4, or those denoted by numerals 80, 81, 82, 83, 84 and 85 of FIGURE 5, transmit torque from the outer barrel 10 to the inner barrel 14 while allowing great freedom of axial translation between the barrels. It is to be stressed that although the invention is described as carrying torque from the outer to the inner barrel, that the device of this invention could just as easily carry torque from the inner barrel to the outer barrel while allowing nearly frictionless relative axial translation between the barrels.

Although the invention has been described in detail above, it is not intended that the invention should be limited by that description, but only in accordance with the spirit and scope of the following claims.

What is claimed is:

1. A well tool having a percussion sub comprising:

an outer barrel, adapted to be rotated, having a plurality of circumferentially distributed substantially axial channels positioned in a region of the inner surface thereof, adapted to receive rolling means;

an inner barrel, including a percussion sub and a driver sub, having a plurality of substantially axial channels, equal in number to the above said channels and in register with the above said channels, upon the outer surface of a portion of said inner barrel;

a plurality of rollings means, positioned in said two sets of channels to transmit torque from said outer barrel to said inner barrel to rotate said inner barrel while allowing relative axial translation between said barrels;

shoulders on the inner surface of said outer barrel and the outer surface of said inner barrel;

resilient means positioned between said shoulders to bias said inner barrel toward its extended position;

a lubricant surrounding said rolling means; and means for retaining said lubricant.

2. A device as recited in claim 1 in which said rolling members are balls, and said channels are contoured to receive said balls.

3. A well tool having a percussion sub comprising:

an outer barrel, adapted to be rotated, having a plurality of circumferentially distributed substantially axial channels positioned in a region of the inner surface thereof, adapted and contoured to receive rollers;

an inner barrel, including a percussion sub and a driver sub, having a plurality of radially directed axles extending from the outer surface thereof, arranged in a plurality of substantially axial rows in register with said channels;

a plurality of rollers, equal in number to said axles, attached to roll about the axes of said axles and positioned to engage and roll in said channels to carry torque from said outer to said inner barrel while allowing relative axial translation;

shoulders on the inner surface of said outer barrel and the outer surface of said inner barrel;

a spring positioned between said shoulders to bias said inner barrel toward its extended position;

a lubricant surrounding at least said rollers; and means or retaining said lubricant.

4. A device as recited in claim 3 in which said lubricant also surrounds said spring and further comprising stops for limiting the relative translation between said barrels.

5. A well tool having a bumper sub comprising:

an outer barrel, adapted to be rotated, having a plurality of circumferentially distributed substantially axial channels positioned in a region of the inner surface thereof, adapted and contoured to receive rollers;

an inner barrel, including a bumper sub, having a plurality of radially directed axles extending from the outer surface thereof, arranged in a plurality of substantially axial rows in register with said channels;

a plurality of rollers, equal in number to said axles, attached to roll about the axes of said axles and positioned to engage and roll in said channels to carry torque from said outer barrel to said bumper sub while allowing relative axial translation;

a lubricant surrounding said rollers; and means for retaining said lubricant.

6. A well tool having a percussion sub comprising:

an outer barrel, adapted to be rotated, having a plurality of circumferentially distributed axially directed channels along its inner surface adapted to receive a plurality of rolling members;

an inner barrel, including a percussion sub and a driver sub, adapted to reciprocate within said outer barrel between a closed position defined by a first pair of opposed shoulders on said outer barrel and inner barrel and an extended position defined by a second pair of shoulders provided on the inner surface of said outer barrel and the outer surface of said inner barrel;

a plurality of circumferentially distributed axially aligned channels in the outer surface of said inner barrel registering with the aforesaid channels in said outer barrel and adapted to receive said rolling members;

a plurality of rolling members positioned to engage and roll in said channels to carry torque from said outer barrel to said inner barrel while allowing relative axial translation of said barrels between said closed position and said extended position;

a third pair of opposed shoulders on the inner surface of said outer barrel and the outer surface of said inner barrel;

a spring positioned between said third pair of shoulders to bias said inner barrel toward said extended position;

a lubricant surrounding said rolling members; and means for retaining said lubricant.

7. A well tool comprising:

an inner barrel including a percussion sub and a driver sub having a plurality of radially directed axles extending from the outer surface thereof arranged in substantially axial rows, said rows being circumferentially distributed about the axis of said barrel;

a plurality of rolling means attached to roll about the axes of said axles;

an outer barrel having a plurality of channels formed in the inner surface thereof in register with said rolling means and contoured to engage the surfaces thereof;

said rolling means positioned in said channels to carry torque between said barrels while allowing relative axial translation;

shoulders on the inner surface of said outer barrel and the outer surface of said inner barrel;

spring means positioned between said shoulders to bias said inner barrel toward an extended position;

stops on said inner and outer barrels to limit the axial travel thereof;

a lubricant surrounding said rolling means; and means for retaining said lubricant.

*8. A well tool having a bumper sub comprising:*

*an outer barrel adapted to be rotated, having a plurality of circumferentially distributed substantially axial channels positioned in a region of the inner surface thereof, adapted to receive rolling means;*

*an inner barrel, including a bumper sub, having a plurality of substantially axial channels, equal in number and in register with the above said channels, upon the outer surface of a portion of said bumper sub;*

*a plurality of rolling means, positioned in said two sets of channels to transmit torque from said outer barrel to said bumper sub to rotate said bumper sub while allowing relative axial translation between said outer barrel and said bumper sub;*

*a lubricant surrounding said rolling means; and means of retaining said lubricant.*

*9. A device as recited in claim 8 in which said rolling means are balls, and said channels are contoured to receive said balls.*

*10. A well tool having a bumper sub comprising:*

*an outer barrel adapted to be rotated, having a plurality of circumferentially distributed substantially axial channels positioned in a region of the inner surface thereof, adapted to receive rolling means;*

*an inner barrel, including a bumper sub, adapted to reciprocate within said outer barrel between a closed position defined by a first pair of opposed shoulders on said outer barrel and inner barrel and an extended position defined by a second pair of shoulders provided on the inner surface of said outer barrel and the outer surface of said inner barrel;*

*a plurality of circumferentially distributed axially aligned channels in the outer surface of said inner barrel registering with the aforesaid channels in said outer barrel and adapted to receive said rolling means;*

*a plurality of rolling means positioned to engage and roll in said channels to carry torque from said outer barrel to said inner barrel while allowing relative axial translation of said barrels between said closed position and said extended position;*

*a lubricant surrounding said rolling means; and means for retaining said lubricant.*

*11. A device as recited in claim 10 in which said rolling means are balls, and said channels are contoured to receive said balls.*

*12. A device as recited in claim 10 in which said rolling means are balls.*

References Cited

The following references, cited by the Examiner, are of record in the patented file of this patent or the original patent.

UNITED STATES PATENTS

| | | | |
|---|---|---|---|
| 729,365 | 5/1903 | Lehman | 64—23 |
| 2,240,519 | 5/1941 | Reed | 64—23 X |
| 2,568,256 | 9/1951 | Shaffer | 175—293 |
| 2,943,603 | 7/1960 | Bassinger | 64—23 XR |
| 2,996,131 | 8/1961 | Greenwood | 175—293 |
| 3,225,566 | 12/1965 | Leathers | 64—23 |
| 3,319,726 | 5/1967 | Brown | 175—321 X |
| 846,079 | 3/1907 | Yost | 64—23 |
| 1,660,033 | 2/1928 | Braswell | 64—23 |
| 2,113,651 | 4/1938 | Heaston | 64—23 X |
| 2,191,608 | 2/1940 | Goates | 173—97 |
| 2,284,199 | 5/1942 | Greiner | 64—23 |
| 2,774,568 | 12/1956 | Jones | 64—23 X |
| 2,972,471 | 2/1961 | McClintock | 175—293 |
| 3,001,387 | 9/1961 | Schultz | 64—23 |
| 3,203,202 | 8/1965 | Brownyer | 64—23 |

FOREIGN PATENTS

| | | |
|---|---|---|
| 23,434 | 7/1913 | Norway. |

HALL C. COE, Primary Examiner

U.S. Cl. X.R.

175—321